(12) United States Patent
Kim

(10) Patent No.: US 10,560,699 B2
(45) Date of Patent: Feb. 11, 2020

(54) METHOD AND APPARATUS FOR ADAPTIVELY PREDICTING IMAGE USING THRESHOLD VALUE IN IMAGE CODING SYSTEM

(71) Applicant: LG Electronics Inc., Seoul (KR)

(72) Inventor: Dongwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/775,655

(22) PCT Filed: Nov. 13, 2015

(86) PCT No.: PCT/KR2015/012249
§ 371 (c)(1),
(2) Date: May 11, 2018

(87) PCT Pub. No.: WO2017/082443
PCT Pub. Date: May 18, 2017

(65) Prior Publication Data
US 2018/0324437 A1 Nov. 8, 2018

(51) Int. Cl.
*H04N 19/513* (2014.01)
*H04N 19/139* (2014.01)
*H04N 19/176* (2014.01)

(52) U.S. Cl.
CPC ......... *H04N 19/139* (2014.11); *H04N 19/513* (2014.11); *H04N 19/176* (2014.11)

(58) Field of Classification Search
None
See application file for complete search history.

(56) References Cited

U.S. PATENT DOCUMENTS 9,106,924 B2 * 8/2015 Lee ................. H04N 19/44
9,491,461 B2 * 11/2016 Chen ................ H04N 19/52
(Continued)

FOREIGN PATENT DOCUMENTS

| KR | 10-2010-0011628 | 2/2012 |
| KR | 10-2014-0016823 | 2/2014 |
| KR | 10-2014-0022009 | 2/2014 |

*Primary Examiner* — Jayanti K Patel
*Assistant Examiner* — Shadan E Haghani
(74) *Attorney, Agent, or Firm* — Fish & Richardson P.C.

(57) ABSTRACT

An image decoding method according to the present invention comprises the steps of: receiving an MVD for a current block; deriving MVP candidates on the basis of neighboring blocks of the current block; calculating a first threshold value and a second threshold value on the basis of a first MVP candidate and a second MVP candidate included in the MVP candidates; deriving an MVP for the current block on the basis of the MVD; calculating an MV of the current block on the basis of the MVP and the MVD; and generating a prediction sample on the current block on the basis of the MV. According to the present invention, it is possible to determine at least one of the x- and y-coordinate components of an MVP on the basis of a threshold value without explicit signaling and thus reduce the amount of relevant control information, thereby improving coding efficiency. Also, it is possible to differently set the unit of resolution indicated by an MVD for each section on the basis of the threshold value and thus derive an MV over a wide area using a smaller MVD value.

18 Claims, 14 Drawing Sheets

(56) References Cited

U.S. PATENT DOCUMENTS

| | | | |
|---|---|---|---|
| 9,883,186 B2 * | 1/2018 | Lee | ............... H04N 19/513 |
| 2012/0093226 A1 | 4/2012 | Chien et al. | |
| 2014/0126644 A1 | 5/2014 | Strom et al. | |
| 2014/0341297 A1 * | 11/2014 | Chien | ............... H04N 19/13 |
| | | | 375/240.16 |

* cited by examiner

FIG. 6

| Area where encoding of MVP_Flag is not needed (675) | (645) | (650) | Area where encoding of MVP_Flag is not needed (665) |
|---|---|---|---|
| (625) | (615) (605) | $\text{Threshold}_y$ 3 1.5 $\text{Threshold}_x$ $\bigcirc$ $MVP^{c1}$ (5,3) | (635) |
| (630) | 3 (610) 1.5 $\text{Threshold}_y$ $\bigcirc$ $\text{Threshold}_x$ $MVP^{c2}$ (-1,0) | (620) | (640) |
| Area where encoding of MVP_Flag is not needed (670) | (655) | (660) | Area where encoding of MVP_Flag is not needed (680) |

FIG. 11

1/1 Resolution (1130)

1/4 Resolution (1120)

1/8 Resolution (1110)

○
$MVP^{c1}, MVP^{c2}$

METHOD AND APPARATUS FOR ADAPTIVELY PREDICTING IMAGE USING THRESHOLD VALUE IN IMAGE CODING SYSTEM

CROSS-REFERENCE TO RELATED APPLICATIONS

This application is a National Stage application under 35 U.S.C. § 371 of International Application No. PCT/KR2015/012249, filed Nov. 13, 2015. The disclosure of the prior application is incorporated by reference in its entirety.

BACKGROUND OF THE INVENTION

Field of the Invention

The present invention related to an image compression technology and, most particularly, to a method and apparatus for adaptively predicting an image using a threshold value.

Related Art

Recently, demands for high resolution and high picture-quality images have been increasing in diverse applied fields. And, in order to allow such images to achieve the requested high resolution and high picture-quality, the size (or amount) of information related to the corresponding images have also increased accordingly.

Due to the increase in the information size, devices equipped with diverse capabilities and networks corresponding to diverse environments are being introduced. With the advent of such devices having diverse capabilities and networks having diverse environments, the same content may be used at different quality levels.

More specifically, since user devices are capable of supporting images having a wider range of picture quality, and since the wider range of network environments are established, in some environments, the image may be provided at a general picture quality. However, in other environments, the same image may be provided at a higher and more enhanced (or advanced) picture quality.

For example, a consumer may purchase a video content through his or her portable device (or mobile device), and, then, the consumer may enjoy the same video content, which he or she has purchased earlier, at his or her home through a display of a larger and wider screen at a better (or higher) resolution.

Recently, with the provision of broadcast services with high-definition (HD) resolution, a larger number of users are already accustomed to viewing high resolution and high picture quality images. And, accordingly, service providers and users are interested and focusing on HDTV broadcast services as well as Ultra High Definition (UHD) services, which have a resolution 4 times more enhanced than the HDTV services.

An image prediction method is used in order to increase efficiency of image compression (or video compression). And, in order to enhance the prediction performance, diverse additional information may be coded and transmitted from an encoder to a decoder. In case the amount (or size) of additional information increases, the prediction performance achieved in the image itself may be enhanced. However, in this case, as a bit size (or number of bits) assigned to the additional information increases, the overall coding efficiency may be degraded. Therefore, it is very important to increase or maintain the prediction capability while decreasing additional information in order to enhance the coding efficiency.

SUMMARY OF THE INVENTION

Technical Objects

A technical object of the present invention is to provide a method and apparatus for enhancing coding efficiency in a prediction method between screens.

Another technical object of the present invention is to provide a method and apparatus for efficiently deriving a motion vector (MV).

Yet another technical object of the present invention is to provide a method for determining a motion vector predictor (MVP) by a decoder end without any implicit signaling.

Yet another technical object of the present invention is to determine an MVP based on a threshold value.

A further technical object of the present invention is to adaptively differentiate resolution units of a motion vector (MV) for each section based on a threshold value.

Technical Solutions

According to an exemplary embodiment of the present invention, provided herein is a decoding method for an image. The method may include the steps of receiving a motion vector difference (MVD) corresponding to a current block, deriving motion vector predictor (MVP) candidates based on neighboring blocks of the current block, calculating a first threshold value and a second threshold value based on a first MVP candidate and a second MVP candidate being included in the MVP candidates, deriving an MVP corresponding to the current block based on the MVD and the first threshold value and the second threshold value, calculating a motion vector (MV) of the current block based on the MVP and the MVD, generating a prediction sample within the current block based on the MV, and generating a recovery sample based on the prediction sample.

According to another exemplary embodiment of the present invention, provided herein is an inter prediction method for an image. The method may include the steps of receiving a motion vector difference (MVD) corresponding to a current block, deriving motion vector predictor (MVP) candidates based on neighboring blocks of the current block, calculating a first threshold value and a second threshold value based on a first MVP candidate and a second MVP candidate being included in the MVP candidates, deriving an MVP corresponding to the current block based on the derived MVP candidates, calculating a motion vector (MV) of the current block based on the MVP and the MVD, and generating a prediction sample within the current block based on the MV, wherein the MVD adaptively may indicate another resolution unit in accordance with two or more areas being determined based on at least one of the first threshold value and the second threshold value.

Effects of the Invention

According to the present invention, at least one of an x-coordinate component and a y-coordinate component of a motion vector predictor (MVP) may be determined without any explicit signaling, and, accordingly, due to a decrease in the related control information, coding efficiency may be enhanced.

According to the present invention, resolution units indicated by a motion vector (MV) and a motion vector difference (MVD) may be differently determined for each section based on a threshold value, and, accordingly, an MV may be derived from a larger area by using a smaller MVD value. In this case, since the bit size being used for the MVD transmission is decrease, the coding efficiency may be enhanced.

BRIEF DESCRIPTION OF THE DRAWINGS

FIG. 6 illustrates an exemplary drawing of an area where MVP flag information according to a threshold value is not encoded.

FIG. 11 illustrates yet another example of a resolution area according to an exemplary embodiment of the present invention.

DESCRIPTION OF EXEMPLARY EMBODIMENTS

Figure 1:
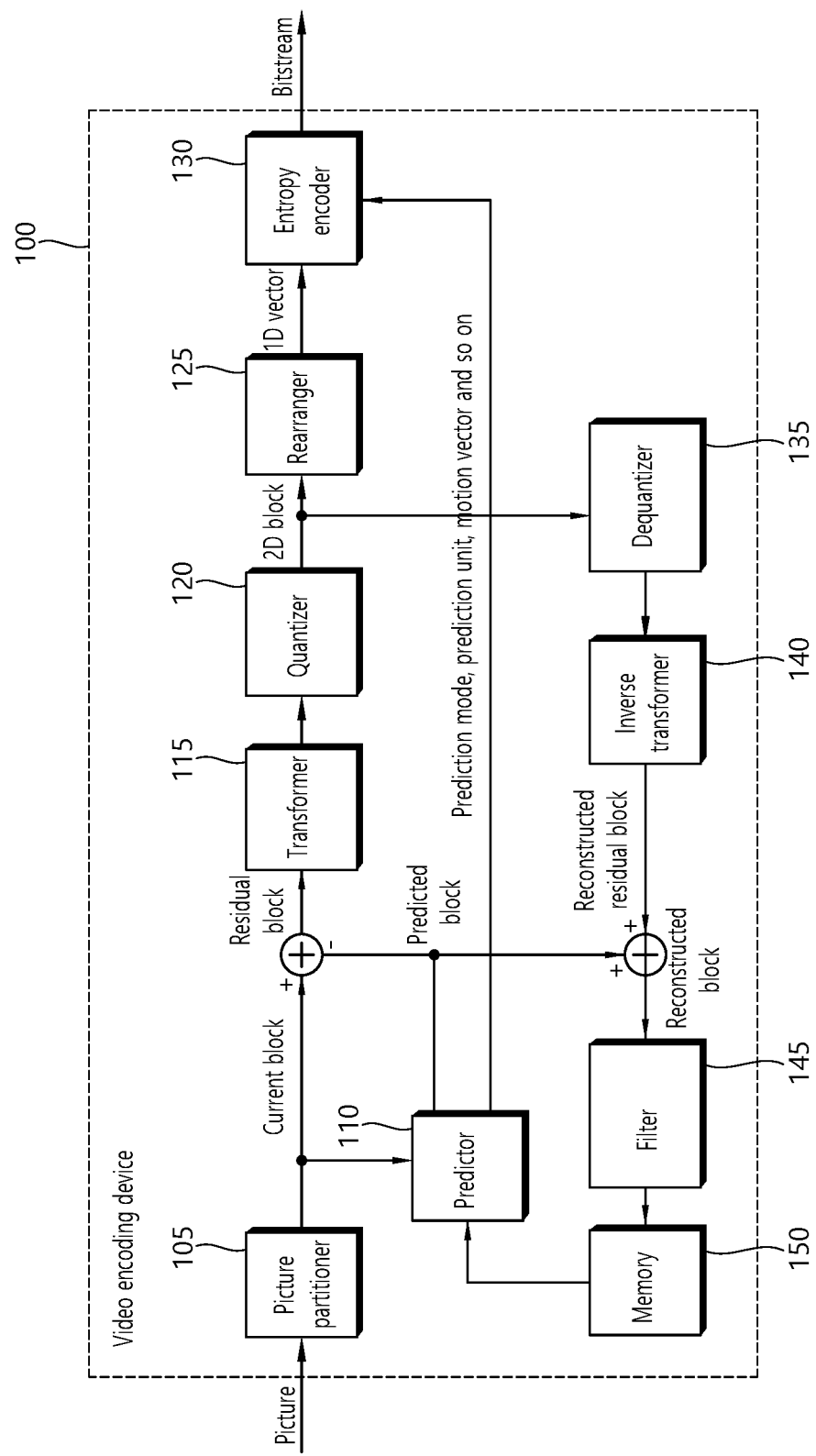
FIG. 1 is a block diagram schematically illustrating a video encoding apparatus according to an embodiment of the present invention.

The present invention can be modified in various forms, and specific embodiments thereof will be described and shown in the drawings. However, the embodiments are not intended for limiting the invention. The terms used in the following description are used to merely describe specific embodiments but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Also, the TU may be split into a quad tree structure from the CU.

The predictor 110 includes an inter prediction unit that performs an inter prediction process and an intra prediction unit that performs an intra prediction process, as will be described later. The predictor 110 performs a prediction process on the processing units of a picture divided by the picture partitioner 105 to create a prediction block including a prediction samples or a prediction samples array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample according to the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process according to the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Also, the residual signal may mean a difference between an original signal and a prediction signal. Also, the difference between the original signal and the prediction signal may be transformed to define the residual signal, or the difference between the original signal and the prediction signal may be transformed and quantized to define the residual signal. The residual signal can be called the residual block in the block unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Accordingly, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Also, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, when necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an Adaptive Loop Filter (ALF), a Sample Adaptive Offset (SAO) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
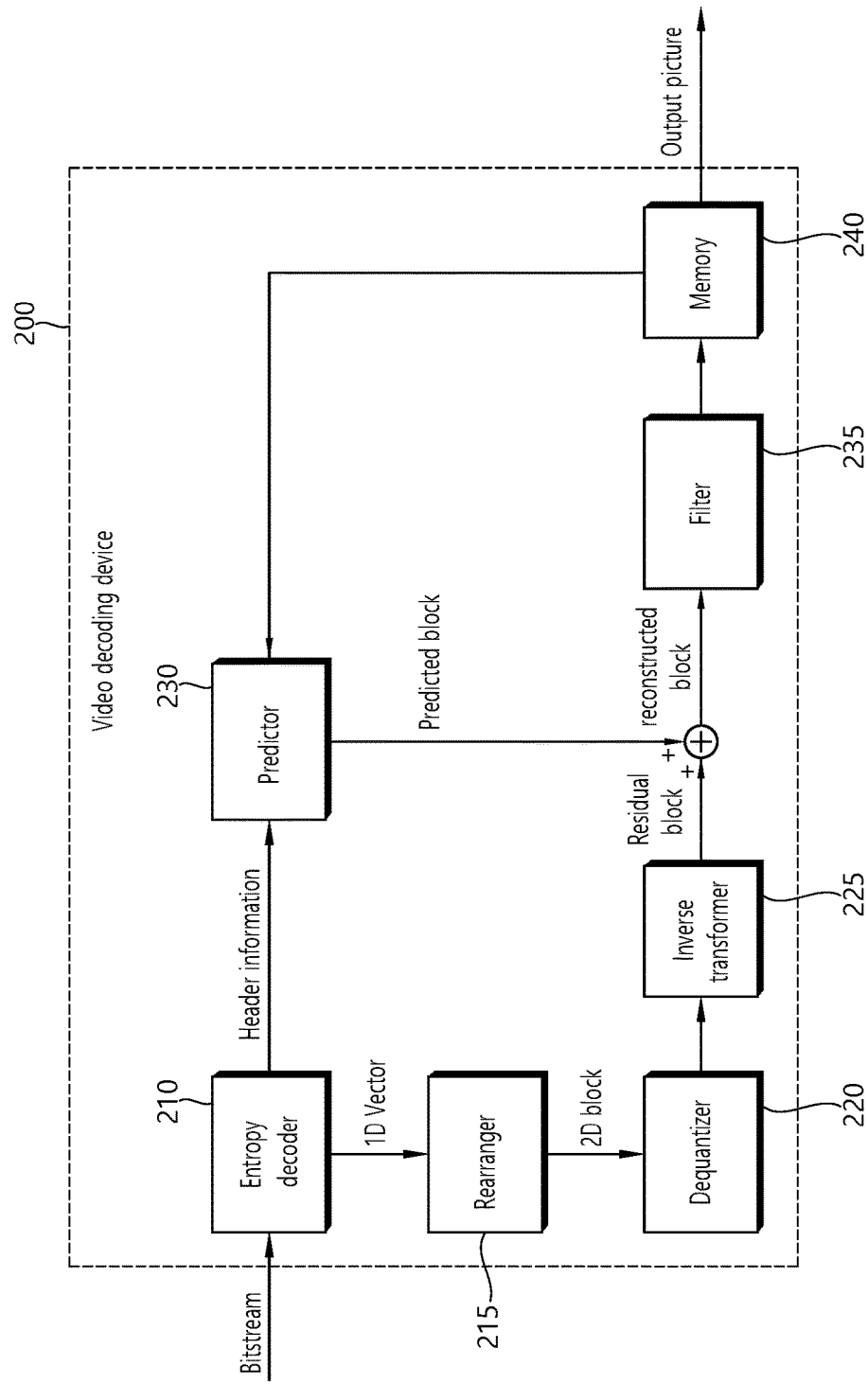
FIG. 2 is a block diagram schematically illustrating a video decoding apparatus according to an embodiment of the present invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded on the basis of the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding (hereinafter referred to as 'VLC'), such as CAVLC, is used to perform entropy encoding in a video encoding device, the entropy decoder 210 may perform decoding using the same VLC table as the encoding device used in the encoding device. Also, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 on the basis of the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed on the basis of a transfer unit or a partition unit of a picture determined by the video encoding device. The transformer of the video encoding device may selectively perform the DCT and/or DST according to plural information pieces such as the prediction method, the size of a current block, and the prediction direction, and the inverse transformer 225 of the video decoding device may perform the inverse transform on the basis of the transform information on the transform performed by the transformer of the video encoding device.

The predictor 230 generates a prediction block including prediction samples or prediction samples array based on the prediction block generation-related information provided by the entropy decoder 210 and the previously decoded block and/or picture information provided from the memory 240.

When the prediction mode for the current PU is the intra prediction mode, the predictor 230 may perform the intra prediction to generate a prediction block based on pixel information in the current picture.

When the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when the Advanced Motion Vector Prediction (AMVP) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference and derive the motion vector for the current block via addition between the decoded motion vector difference and the motion vector predictor.

Also, the encoding device may transmit a reference picture index indicating a reference picture to the decoding device.

The decoding device may predict the motion vector of the current block using the motion information of the neighboring block and derive the motion vector of the current block using the residual received from the encoding device. The decoding device may generate predicted block for the current block based on the derived motion vector and the reference picture index information received from the encoding device.

In another example, when the merge mode is applied, the encoder and decoder may generate a merge candidate list using the motion information of the reconstructed neighboring blocks and/or the motion information of the Col block. That is, when there is motion information of reconstructed neighboring blocks and/or Col blocks, the encoder and decoder may use the motion information as a merge candidate for the current block.

The encoder may select a merge candidate that may provide optimal encoding efficiency among the merge candidates included in the merge candidate list as motion information for the current block. In this connection, a merge index indicating the selected merge candidate may be included in the bitstream and transmitted to the decoder. The decoder may select one of the merge candidates included in the merge candidate list using the transmitted merge index. The decoder may determine the selected merge candidate as motion information of the current block.

Accordingly, when the merge mode is applied, motion information corresponding to reconstructed neighboring blocks and/or Col blocks may be used as motion information of the current block. The decoder may reconstruct the current block by adding the predicted block and the residual transmitted from the encoder.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Accordingly, in the case of skip mode, the encoder does not transmit syntax information such as the residual to the decoding device in addition to information indicating which block's motion information to use as the motion information for the current block.

The encoder and decoder may generate a predicted block of the current block by performing motion compensation on the current block based on the derived motion information. In this connection, the predicted block may be a motion compensated block generated by performing motion compensation on the current block. Also, a plurality of motion compensated blocks may constitute one motion compensated image.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed sample array as described above, the predicted block includes a prediction samples or a prediction sample array, the residual block may include residual samples or a residual sample array. Accordingly, the reconstructed samples or the reconstructed sample array can be considered to be generated by combining the corresponding prediction samples or prediction sample array with the corresponding residual samples or residual sample array.

When the skip mode is used, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parser not shown in the drawing that parses information related to the encoded images included in a bitstream. The parser may include the entropy decoder 210 and may be included in the entropy decoder 210. Such a parser may also be implemented as an element of the decoding module.

Figure 3:
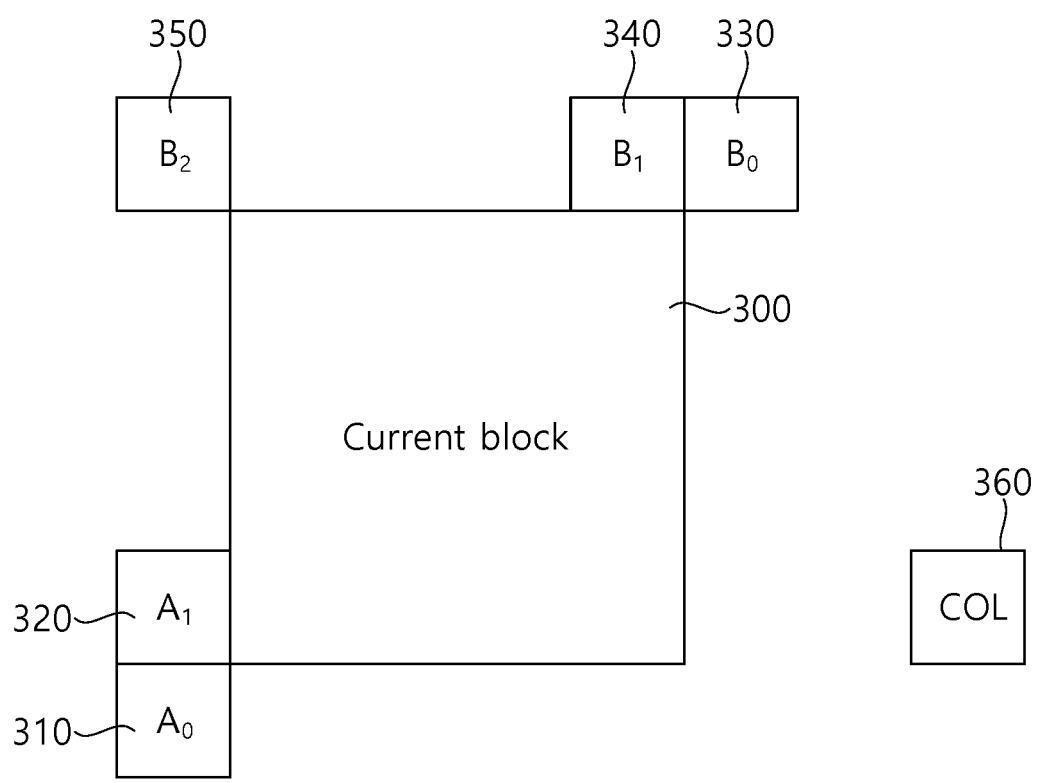
FIG. 3 is a block diagram schematically describing an embodiment of a candidate block usable in the case that an inter-prediction is performed for a current block.

FIG. 3 schematically illustrates an example of a candidate block that may be used when inter prediction is performed on a current block. In this connection, the current block may be a predicted block.

The prediction module of the encoder and decoder may use as candidate blocks, reconstructed neighboring blocks at predetermined positions around the current block 300. For example, in the example of FIG. 3, two blocks A0 310 and A1 320 located on the left side of the current block and three blocks B0 330, B1 340, and B2 350 above the current block may be selected as spatial candidate blocks. In this connection, the block A0 310 may be referred to as a lower left neighboring block, the block A1 320 may be referred to as a left neighboring block. The block B0 330 may be referred to as the upper right neighboring block. The block B1 340 is referred to as an upper neighboring block. The block B2 350 may be referred to as an upper left neighboring block.

Also, as a temporal candidate block in addition to a spatially adjacent block, the above-described Col block 360 may be used as a candidate block. The Col block 360 may correspond to a block spatially corresponding to the current block within a collocated picture (hereinafter referred to as a 'Col picture'), among the recovered (or reconstructed) reference pictures, or may correspond to a block existing in a predetermined relative location (i.e., a location inside and/or outside of a block existing in a location spatially corresponding to the current block).

More specifically, in the AMVP mode, an optimal motion vector predictor (MVP) for the current block is selected from a MVP candidate set (MVPcs), which includes MVP candidates derived from the candidate blocks. In this case, the encoder performs motion estimation so as to derive an optimal MVP from the MVP candidate set (MVPcs) based on an MV, which is derived from the current block, and to calculate a motion vector difference (MVD) by subtracting (or excluding) the MVP from the MV. The encoder encodes MVP flag information indicating which MVP, among the MVP candidates included in the MVP candidate set, corresponds to the MVP for the current block, and MVD information indicating an x-axis value and a y-axis value of the calculated MVD. And, then, the encoder transmits the encoded information to the decoder. In the present invention, the MVP flag information may also be referred to as MVP index information.

The decoder may derive and MVP corresponding to the current block from the MVP candidate set based on the MVP flag information and MVD, which are transmitted from the encoder, and, then, the decoder may derive an MV of the current block by adding the MVD to the derived MVP. Also, the decoder may derive a reference block within a reference picture based on the MV of the current block and may use the reference block as a prediction block for the current block.

In case of the above-described AMVP mode, the bit size being transmitted may slightly increase due to the additional information, such as the MVP flag information. However, due to the usage of the MVP, the size of the MVD that is to be indicated is reduced. Eventually, since the bit size being used for the MVD information is significantly reduced as compared to the increase in the bit size caused by the MVP flag information, the coding efficiency may be enhanced.

For example, in case a motion vector of A1 320 is configured in the MVP candidate set as a first MVP candidate, and a motion vector of B1 340 is configured in the MVP candidate set as a second MVP candidate, the encoder may select the MVP candidate that is most approximate (similar) to the MV of the current block, from the first MVP candidate and the second MVP candidate, and may then calculate the MVD. If the second MVP candidate is selected, the encoder encodes the MVP flag information indicating the second MVP candidate and the MVD information corresponding to the calculated MVD and, then, transmits the encoded information to the decoder. The decoder may derive the second MVP candidate as the MVP of the current block based on the MVP flag information, and the decoder may derive the MV of the current block based on the MVP and the MVD information.

In case of the above-described AMVP mode, the bit size of the MVD information may be reduced by using the MVP. However, since the additional information is always required to be transmitted by encoding the MVP flag information, such additional information is disadvantageous in enhancing the encoding efficiency. The present invention provides a method of implicitly deriving an MVP of the current block without explicitly transmitting the MVP flag information according to the characteristics of the corresponding image.

According to the present invention, a threshold value is calculated by using a plurality of MVP candidates, and, then, by comparing the calculated threshold value with the MVD, the MVP flag information may not be transmitted/received in accordance with a predetermined condition. Additionally, in the present invention, an MVP candidate may be selected for each of the x-axis and the y-axis, and the selected MVP candidates may be encoded. Thereafter, the coding efficiency may be enhanced by further reducing the size of the MVD based on the encoded MVP candidates.

In order to calculate the threshold value, among the plurality of MVP candidates, a first MVP candidate and a second MVP candidate are used. The threshold value may include an x-axis threshold value and a y-axis threshold value, and, for example, the corresponding threshold values may be derived as shown below in the following table.

TABLE 1

MVPc1 ∈ MVPcs, MVPc2 ∈ MVPcs
MVPc1 ≠ MVPc2
MVPc1 = argmin|MVPc1 − MVPc2|
$threshold_x$ = |xMVPc1 − xMVPc2|/2
$threshold_y$ = |yMVPc1 − yMVPc2|/2

Herein, MVPc1 indicates the first MVP candidate, and MVPc2 indicates the second MVP candidate, and, as a first threshold value, $threshold_x$ indicates the x-axis threshold value, and, as a second threshold value, $threshold_y$ indicates the y-axis threshold value. Each of xMVPc1 and yMVPc1 respectively indicates an x-coordinate and a y-coordinate of the first MVP candidate, and each of xMVPc2 and yMVPc2 respectively indicates an x-coordinate and a y-coordinate of the second MVP candidate. As shown in the table presented above, MVP candidates each having a different value may be selected as the first MVP candidate and the second MVP candidate. And, argmin|MVPc1−MVPc2| indicates the MVPc1 and/or the MVPc2 that may cancel |MVPc1−MVPc2|. More specifically, in case the number of MVP candidates being included in the MVPcs is greater than 2, among the MVP candidates, two MVP candidates having the shortest distance between one another may also be selected as the first MVP candidate and the second MVP candidate. In this case, the first MVP candidate and the second MVP candidate may be determined in a relation between each MVP candidate and another MVP candidate having the shortest distance between one another.

For example, MVPcs may include at least two of $MVP_{median}$, $MVP_{col}$, $MVP_A$, $MVP_B$, and $MVP_{(0,0)}$. Herein, median indicates a medium value, and, for example, $MVP_{median}$ may include median($MVP_A$, $MVP_B$). $MVP_{col}$ may indicate a temporal MVP candidate, which is acquired based on a temporally neighboring (or surrounding) block, and $MVP_{(0,0)}$ $\triangleq$ may indicate an MVP candidate having a zero vector value.

Meanwhile, in case the number of MVP candidates within the MVPcs is equal to 2, the two MVP candidates may be directly selected as the first MVP candidate and the second MVP candidate.

According to the table presented above, the first threshold value is determined as a value obtained by dividing an absolute value of a difference between the xMVPc1 and the xMVPc2 by 2, and the second threshold value is determined as a value obtained by dividing an absolute value of a difference between the yMVPc1 and the yMVPc2 by 2. For example, in case the MVPc1 is equal to (3,5) and the MVPc2 is equal to (0,−1), the first threshold value is equal to |3−0|/2=1.5, and the second threshold value is equal to |5+1|/2=3.

Meanwhile, the MVD information, which is transmitted from the encoder, may be differentiated as an x-axis MVD (xMVD) and a y-axis MVD(yMVD). In case the size of the xMVD (i.e., |xMVD|), is larger than the first threshold value, the decoder may deduce one of xMVPc1 and xMVPc2 as the xMVP corresponding to the current block. For example, in case the xMVD is a positive number, the decoder may deduce the relatively larger value between the xMVPc1 and the xMVPc2 as the xMVP corresponding to the current block. Additionally, in case the xMVD is a negative number, the decoder may deduce the relatively smaller value between the xMVPc1 and the xMVPc2 as the xMVP corresponding to the current block.

In case the size of the yMVD (i.e., |yMVD|), is larger than the second threshold value, the decoder may deduce one of yMVPc1 and yMVPc2 as the yMVP corresponding to the current block. For example, in case the yMVD is a positive number, the decoder may deduce the relatively larger value between the yMVPc1 and the yMVPc2 as the yMVP corresponding to the current block. Additionally, in case the yMVD is a negative number, the decoder may deduce the relatively smaller value between the yMVPc1 and the yMVPc2 as the yMVP corresponding to the current block.

Meanwhile, in case the size of the xMVD is not larger than the first threshold value, the decoder may receive the xMVP flag information and may derive an x-coordinate component of the MVP of the current block from the x-coordinate components of the MVP candidates. Additionally, in case the size of the yMVD is not larger than the second threshold value, the decoder may receive the yMVP flag information and may derive a y-coordinate component of the MVP of the current block from the y-coordinate components of the MVP candidates. Herein, the xMVP flag information and the yMVP flag information may also be respectively referred to as xMVP index information and yMVP index information.

More specifically, according to the present invention, if the size of the MVD is larger than the threshold value, the encoder may not encode a flag indicating which MVP candidate has been used from the MVPcs. Since the decoder is aware (or informed) of the threshold values that are calculated from MVPc1 and MVPc2, which are included in the MVPcs, and since the decoder is also aware (or informed) of the MVD that is received from the encoder, the decoder may deduce which MVP candidate has been used for deriving the MVP corresponding to the current block.

The method for deducing the MVP based upon the above-described MDV and threshold values may hereinafter be described in more detail.

Figure 4:
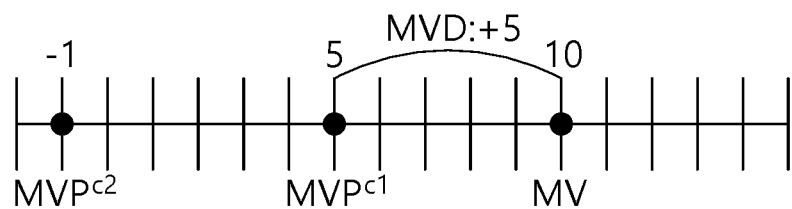
FIG. 4 illustrates an example of deriving an xMVP based on an MVD and a threshold value in an x-axis.

FIG. 4 illustrates an example of deriving an xMVP based on an MVD and a threshold value in an x-axis.

Referring to FIG. 4, in case the MVPcs includes two MVP candidates, and in case the MVPc1 corresponds to (5,3) and the MVPc2 corresponds to (−1,0), the first threshold value (threshold$_x$) is equal to 3, and the second threshold value (threshold$_y$) is equal to 1.5. Herein, if an optimal MV corresponding to the current block, which is obtained through a motion estimation performed by the encoder, corresponds to (10,5), for the x-axis, the encoder may select xMVPc1 as the xMVP of the current block, and the xMVD shall be equal to 5. In this case, since the size of the xMVD is larger than the first threshold value, and since the xMVD is a positive number, even if it is not indicated by any other information, the decoder may deduce xMVPc1, which corresponds to the larger one of xMVPc1 and xMVPc2, as the xMVP.

The corresponding reason will be more clarified with reference to the following drawing.

Figure 5:
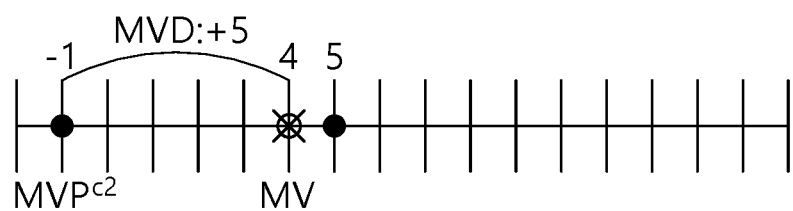
FIG. 5 illustrates an example of a case where a MVPc2 is selected in the x-axis.

FIG. 5 illustrates an example of a case where a MVPc2 is selected in the x-axis.

Referring to FIG. 5, in the same example that is described above with reference to FIG. 4, it is assumed that the xMVPc2 is selected, and the MV of the current block is calculated as xMVPc2(−1)+xMVD(5)=4. However, if the xMV was actually equal to 4, since the encoder would have selected xMVPc1(5), which has a value closest (or most approximate) to 4, and the xMVD would have been encoded as 1, the assumption that the encoder has selected xMVPc2 becomes false. Accordingly, the decoder may deduce that the encoder has selected xMVPc1. And, in this case, the decoding process may be performed without any error. By performing a comparison between the x- and y-coordinate components of the MVD and the x- and y-coordinate components of the threshold value based on the above-described method, if a specific condition is satisfied, the MVP corresponding to the current block may be derived without performing any decoding of the MVP flag (xMVP flag and/or yMVP flag). Although the above-described example presents a case where two MVP candidates exist in the MVPcs, the exemplary embodiment of the present invention may also be equally applied to cases where more than two MVP candidates exist in the MVPcs.

Meanwhile, although the example presented above describes only the x-axis, a case where the present invention is expanded to the x-axis and the y-axis is as described below.

FIG. 6 illustrates an exemplary drawing of an area where MVP flag information according to a threshold value is not encoded. FIG. 6 shows threshold values corresponding to both the x-axis and the y-axis, when the MVPc1 is equal to (5,3) and the MVPc2 is equal to (−1,0).

Referring to FIG. 6, vertical segments represent thresholds (or critical lines) corresponding to threshold$_x$, horizontal segments represent thresholds corresponding to threshold$_y$. For example, the vertical segments may correspond to (xMVPc1+threshold$_x$, y), (xMVPc1−threshold$_x$, y) (or (xMVPc2+threshold$_x$, y)), and (xMVPc2−threshold$_x$, y). Additionally, for example, the horizontal segments may correspond to (x, yMVPc1+threshold$_y$), (x, yMVPc1−threshold$_y$) (or (x, yMVPc2−threshold$_y$)), and (x, yMVPc2−threshold$_y$).

In case the MV is positioned in area 605 and area 610, since each of the xMVD and yMVD values is respectively smaller than the threshold values threshold and threshold$_y$, the xMVP flag information and the yMVP flag information may be encoded and transmitted to the decoder.

If |xMVD| is larger than threshold$_x$, and if |yMVD| is larger than threshold$_y$, the xMVP flag information and the yMVP flag information are not required to be encoded, and the decoder may deduce and use each of the optimal xMVP and yMVP for the x-axis and the y-axis, respectively. In this case, the MVP candidate corresponding to xMVP and the MVP candidate corresponding to yMVP may be different from one another. More specifically, for example, the xMVPc1 may be deduced as the xMVP, and the yMVPc1 may be deduced as the yMVP. And, thus, the final MVP may be derived accordingly. In case the MV is positioned in area 675 and area 680 of FIG. 6, each of the xMVP and the yMVP may be derived from a different MVP candidate.

For example, in case the MVPc1 corresponds to (5,3) and the MVPc2 corresponds to (−1,0), threshold is equal to 3, threshold$_y$ is equal to 1.5. At this point, in case the optimal MV corresponds to (10,−2), the corresponding MV is located in area 680 of FIG. 6. In this case, the xMVP is selected from xMVPc1, and the yMVP is selected from yMVPc2. In this case, since the xMVD is equal to 5(=10-5), and since the yMVD is equal to −2(=−2=0), this corresponds to a case where the |xMVD| is larger (or greater) than threshold and a case where the |yMVD| is larger (or greater) than threshold$_y$. Also, in this case, the encoder is not required to encode the MVP flags (i.e., both the xMVP flag and the yMVP flag), and the decoder is not required to decode the MVP flag.

Meanwhile, in area 615 and area 620 (a case where the MV is located in area 615 or area 620), each of an optimal xMVP and an optimal yMVP is selected for the x-axis and the y-axis, and, then, the xMVP flag information and the yMVP flag information are encoded. For example, in case (0,2) is determined as the optimal MV corresponding to the current block, xMVPc2 may be selected as the xMVP for the x-axis, and yMVPc1 may be selected as the yMVP for the y-axis. In this case, the xMVD is equal to 1(=0−(−1)), and the xMVP flag information indicates MVPc2. Additionally, in this case, the yMVD is equal to −1(2−3), and the yMVP flag information indicates MVPc1.

Additionally, in case the optimal MV is located in area 625, xMVPc2 is selected for the x-axis, and since the |xMVD| is larger (or greater) than threshold$_x$, separate xMVP flag information is not encoded. In this case, since the xMVD is a negative number, the decoder may determine xMVPc1 as the xMVP because the xMVPc1 has the relatively smaller value between xMVPc1 and xMVPc2. And, yMVPc1 is selected for the y-axis, and since |yMVD| is smaller than threshold$_y$, the yMVP flag information is encoded. Conversely, in case the optimal MV is located in area 635, the xMVP flag information is encoded, and the yMVP flag is not encoded.

Meanwhile, apart from the MVP flag information, the coding rate may also be enhanced by reducing the bit size being assigned to the MVD information. According to the present invention, a specific area is determined based on the threshold value, and the MV may be set to have a high resolution in the corresponding specific area, and the MV may be set to have a relatively lower resolution is other areas. This may be referred to as a Progress Motion Vector Resolution (PMVR) method. Since it is very likely that the optimal motion vector is positioned near the MVP, and since the likelihood decreases as the motion vector is positioned further away from the MVP, based on this characteristic, this method is used in order to reduce the bit size being allocated to the MVD information by searching for a reference block corresponding to the current block at a high resolution when the motion vector is near the MVP and by searching for a reference corresponding to the current block at a relatively lower resolution in case the motion vector is positioned further away from the MVP as much as a predetermined threshold value or more.

In this case, within the corresponding area, if the MV is set to have a high resolution, such as a quarter (¼) pixel resolution, and so on, even though the bit size that is used for encoding the MVD may be increased, the coding efficiency may be enhanced by reducing prediction errors between the screens. Conversely, as the optimal MV is positioned further away from the MVP, since the likelihood of determining the optimal MV decreases, the coding efficiency may be enhanced by determining the resolution of the MV so as to reduce the bit size that is used for encoding the MVD.

Figure 7:
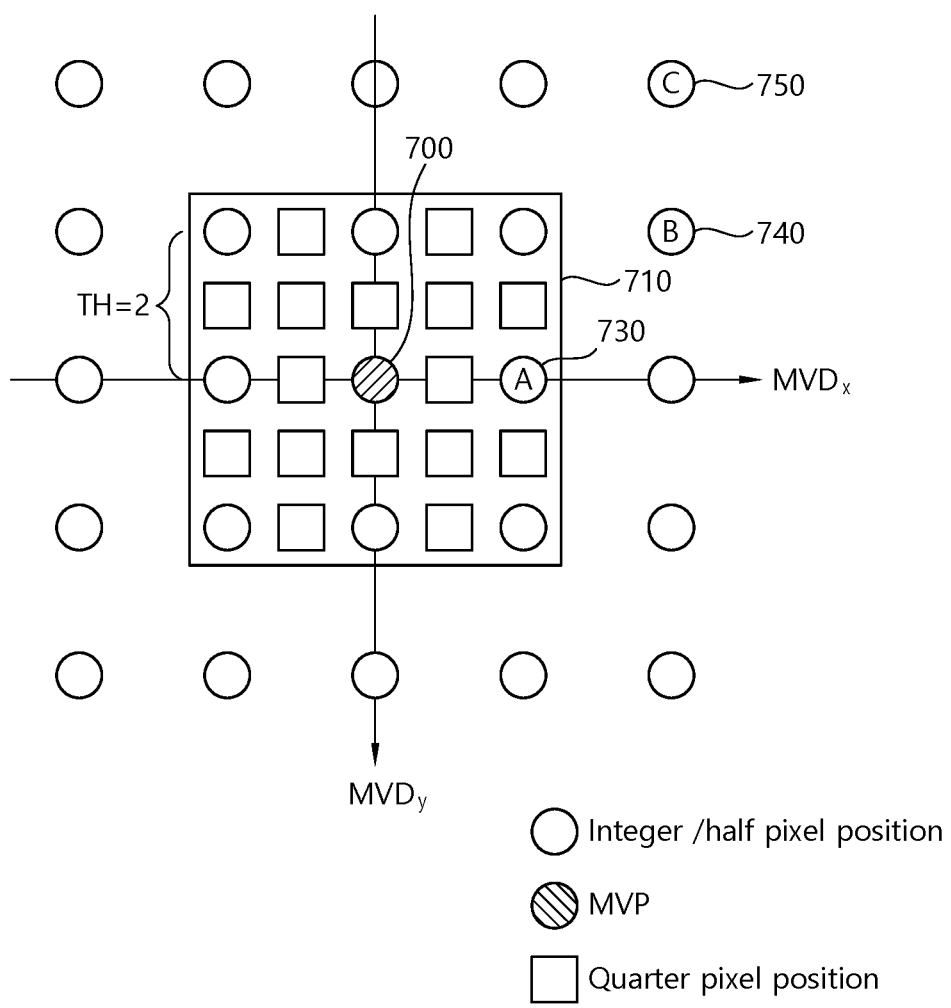
FIG. 7 is a drawing showing a PMVR method according to an exemplary embodiment of the present invention.

FIG. 7 is a drawing showing a PMVR method according to an exemplary embodiment of the present invention.

Referring to FIG. 7, based on the MVP 700, an area 710 may be designed based on a threshold value. FIG. 7 illustrates a case where a fixed threshold of '2' is used for both the x-axis and the y-axis.

In this case, in the area 710, the motion may be predicted in ¼ pixel units, and in other areas excluding the area 710, the motion may be predicted in ½ pixel units or integer pixel units. For example, in case the MVD corresponds to (2,0), since the x-coordinate value is equal to 2, and since this value is within the threshold value range of 2, the MVD indicates a ¼ pixel unit, and the location indicated by the MV of the current block corresponds to A 730. Meanwhile, in case the MVD corresponds to (3,2), since the x-coordinate value is equal to 3, and since is greater than the threshold value 2, based on the MVP, up to the threshold value, the MVD is calculated in ¼ pixel units, and starting from the point where the threshold value is exceeded, the MVD is calculated in ½ pixel units. In this case, the location indicated by the MV of the current block corresponds to B 740. Similarly, in case the MVD corresponds to (3,3), the location indicated by the MV of the current block corresponds to C 750.

According to the present invention, an area may be adaptively specified by using a first threshold value (threshold$_x$) and a second threshold value (threshold$_y$), which are derived by reflecting the characteristics of the above-described image without using a fixed threshold value. In this case, since the MVD may indicate another resolution unit in accordance with an area respective to the threshold value, the coding efficiency may be enhanced by adaptively changing (or modifying) the area, wherein the resolution unit of the MVD is changed in accordance with the characteristics of the image.

In case the distribution (or dispersion) of the motion vectors corresponding to the current block or the neighboring blocks of a random area increases, when the MV of the current block is calculated based on the MVPcs, the MVD, which corresponds to the respective prediction error, tends to be increased. Conversely, in case the distribution (or dispersion) of the motion vectors corresponding to the neighboring blocks decreases, when the MV of the current block is calculated based on the MVPcs, the MVD, which corresponds to the respective prediction error, tends to be decreased. More specifically, the threshold value being calculated by using the MVPcs may indicate motion characteristics. In other words, the threshold value may act as a scale for predicting how large or small the difference between the MVP, which is derived from the neighboring blocks, and the MV of the current block will be. Therefore, the size of the MV (and the MVD) may be predicted in accordance with the threshold value. Therefore, an area may be calculated by using the above-described threshold value, and coding may be performed by differently applying the resolution of the MVD in accordance with the calculated area. For example, in case the distribution (or dispersion) of the MVPcs is decreased, since an optimal MV is determined to be near (or close to) the MVP (or in the neighboring (or surrounding) locations of the MVP), it will be advantageous in the aspect of the coding efficiency for a small threshold value to be derived and for an area, wherein the MVD indicates a high resolution (i.e., a pixel unit resolution having a relatively small fractional value), to be reduced. Conversely, in case the distribution (or dispersion) level of the MVPcs is high, since the optimal MV is located further away from the surroundings of the MVP, it will be advantageous in the aspect of the coding efficiency for a large threshold value to be derived and for an area, wherein the MVD indicates a high resolution, to be increased.

Therefore, according to the present invention, among the two or more areas in which the MVD is determined based on the threshold value, a first fractional pixel resolution unit may be indicated for a first area, and a second fractional pixel (or integer pixel) resolution unit may be indicated for a second area. More specifically, for example, the xMVD may indicate the first fractional pixel resolution unit for a section that is not larger than the first threshold value, and the xMVD may indicate the second fractional pixel or integer pixel resolution unit for a section that is larger than the first threshold value. Additionally, the yMVD may indicate the first fractional pixel resolution unit for a section that is not larger than the second threshold value, and the yMVD may indicate the second fractional pixel or integer pixel resolution unit for a section that is larger than the second threshold value.

In this case, a value of the first fraction may be smaller than a value of the second fraction. For example, the first fraction may indicate ¼, and the second fraction may indicate ½. Alternatively, the first fraction may indicate ⅛, and the second fraction may indicate ¼ or ½.

Figure 8:
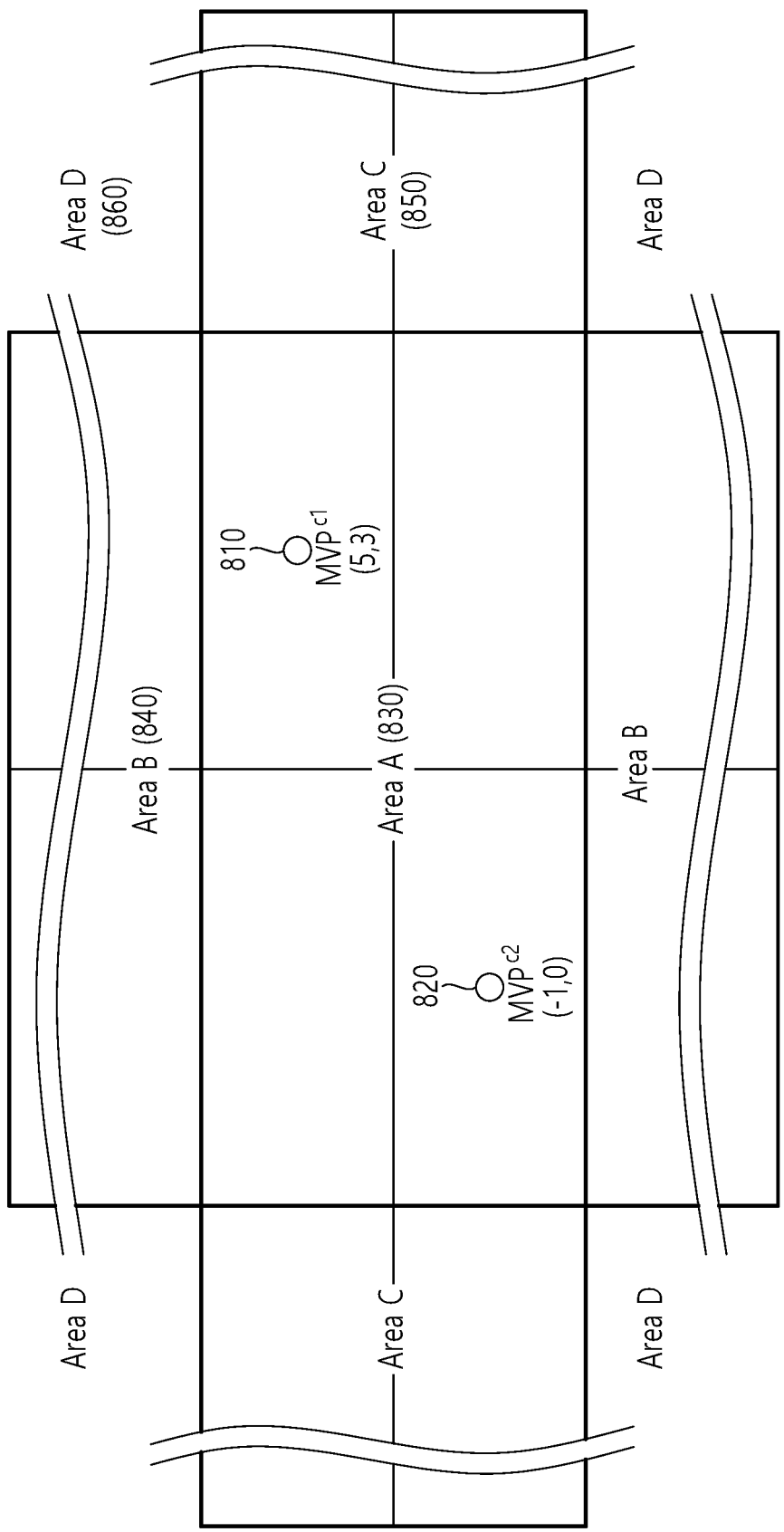
FIG. 8 is an example of an area being determined based on a threshold value according to the present invention.

FIG. 8 is an example of an area being determined based on a threshold value according to the present invention. FIG. 8 illustrates an example of a case where a value of the MVPc1 810 is equal to (5,3) and a value of the MVPc2 820 is equal to (−1,0). Even in a case where the MVPc1 810 and the MVPc2 820 have different values, although the size of the corresponding area varies due to the change in the threshold values, the present invention may be equally applied.

Referring to FIG. 8, vertical segments represent thresholds (or critical lines) corresponding to $threshold_x$, horizontal segments represent thresholds corresponding to $threshold_y$. For example, the vertical segments may correspond to (xMVPc1+$threshold_x$, y), (xMVPc1−$threshold_x$, y) (or (xMVPc2+$threshold_x$, y)), and (xMVPc2−$threshold_x$, y). Additionally, for example, the horizontal segments may correspond to (x, yMVPc1+$threshold_y$), (x, yMVPc1−$threshold_y$) (or (x, yMVPc2−$threshold_y$)), and (x, yMVPc2−$threshold_y$).

The area A 830 may represent an area surrounded by four segments (xMVPc1+$threshold_x$, y), (xMVPc2−$threshold_x$, y), (x, yMVPc1+$threshold_y$), and (x, yMVPc2−$threshold_y$). The area A 830 represents an area, wherein the |xMVD| is smaller than $threshold_y$ and the |yMVD| is smaller than $threshold_y$. In this case, the xMVD and the yMVD may indicate a ¼ pixel unit resolution.

The area B 840 represents an area, wherein the |xMVD| is larger (or greater) than $threshold_y$ and the |yMVD| is smaller than $threshold_y$. In the area B 840, the xMVD and the yMVD may indicate a ½ pixel unit resolution.

The area C 850 represents an area, wherein the |xMVD| is smaller than $threshold_y$ and the |yMVD| is larger (or greater) than $threshold_y$. In the area C 850, the xMVD and the yMVD may indicate a ½ pixel unit resolution.

The area D 860 represents an area, wherein the |xMVD| is larger (or greater) than $threshold_y$ and the |yMVD| is smaller than $threshold_y$. In the area D 860, the xMVD and the yMVD may indicate an integer pixel unit resolution.

Meanwhile, in case the two MVP candidates (or all of the MVPcs) have the same value or have almost no difference between one another, the threshold value becomes very small. And, therefore, the size of an area that adaptively changes the motion resolution also becomes smaller. Accordingly, when determining an area based on the threshold value, the size of the area may be adjusted by deriving at least one of the corrected threshold values by using a method of multiplying the threshold value by a random value, by adding a random value to the threshold value, or by subtracting a random value from the threshold value.

Additionally, by designating a minimum and/or maximum size of the x-axis (and/or y-axis) threshold value, a minimum size and/or maximum size of the corresponding area may be predefined in advance. For example, size information indicating the x-axis (and/or y-axis) minimum size and/or the x-axis (and/or y-axis) maximum size of the corresponding area may be transmitted by being included in a sequence parameter set (SPS) syntax or a picture parameter set (PPS) syntax or may be transmitted by being included in a sequence header, a picture header, or a slice header. Alternatively, a fixed value may also be used as the size information. Moreover, based on a quantization parameter (Qp) value, the threshold value may be multiplied by a random value, or the maximum value and the minimum value may be varied. In another example, an area may be defined by multiplying the threshold value by a value that is defined in the picture header.

Figure 9:
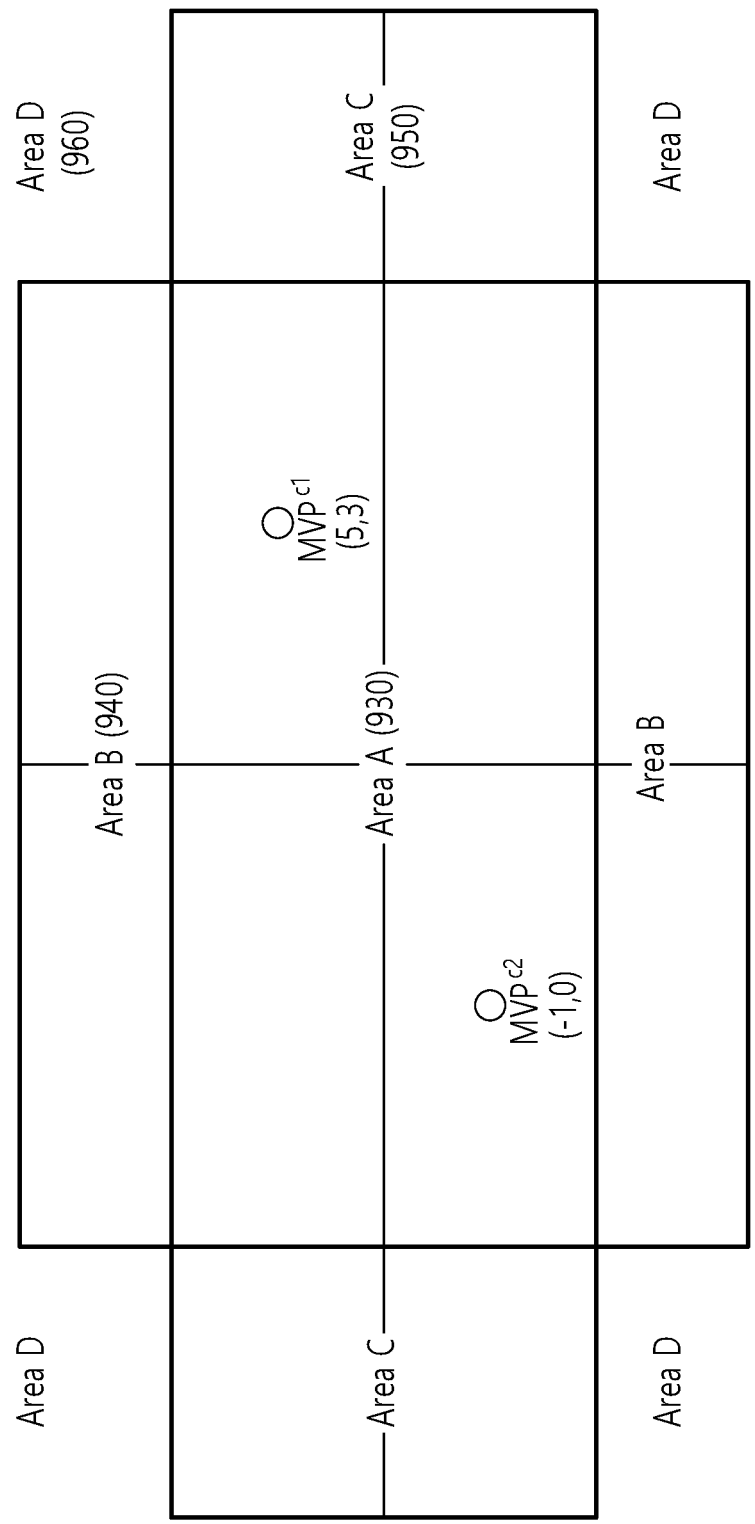
FIG. 9 illustrates an example of a resolution area according to an exemplary embodiment of the present invention.

FIG. 9 illustrates an example of a resolution area according to an exemplary embodiment of the present invention. In the example shown in FIG. 9, the area is limited to its maximum size.

Referring to FIG. 9, vertical segments represent thresholds (or critical lines) corresponding to $threshold_x$, horizontal segments represent thresholds corresponding to $threshold_y$.

Unlike FIG. 8, in FIG. 9, area B 940 and area C 950 do not have areas that continuously extends along the direction of the x-axis or the direction of the y-axis, and each area is limited to its predefined maximum size along each of the x-axis and the y-axis.

Just as in the above-described example, in area A 930, the MVD may indicate a ¼ pixel unit resolution, and, in area B 940 and area C 950, the MVD may indicate a ½ pixel unit resolution, and, in area D 960, the MVD may indicate an integer pixel unit resolution.

Figure 10:
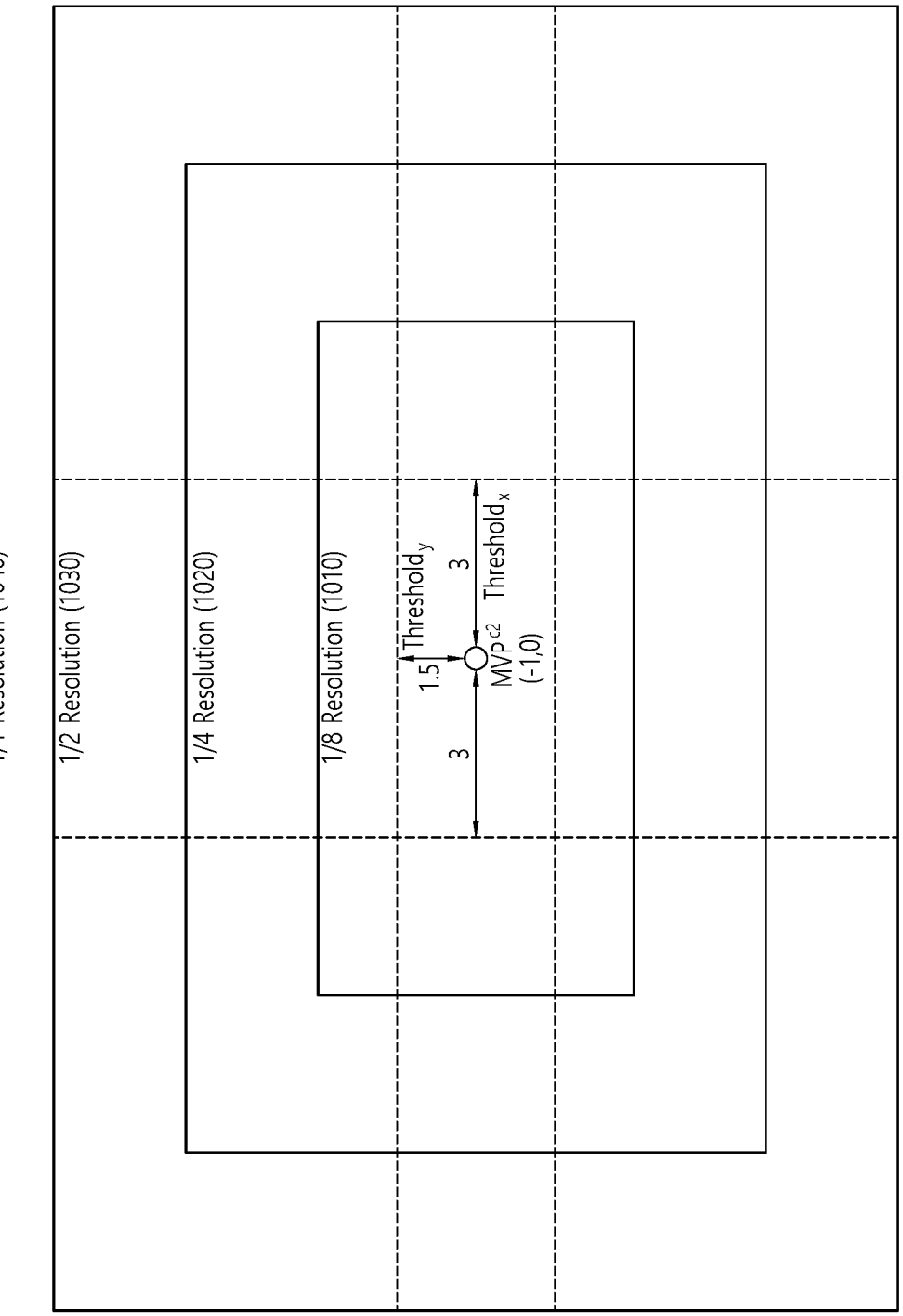
FIG. 10 illustrates another example of a resolution area according to an exemplary embodiment of the present invention.

FIG. 10 illustrates another example of a resolution area according to an exemplary embodiment of the present invention. FIG. 10 shows a case where the threshold is equal to 3, $threshold_y$ is equal to 1.5 and an example of multiplying the threshold values by a specific value. In this case, the specific value may be determined in accordance with a quantization parameter (Qp).

Referring to FIG. 9, vertical segments represent thresholds (or critical lines) corresponding to $threshold_x$ based on MVPc2, and horizontal segments represent thresholds corresponding to $threshold_y$ based on the MVPc2.

In FIG. 10, area 1010 corresponds to an area where each of $threshold_x$ and $threshold_y$ is multiplied by 2. Herein, area 1010 has a ⅛ pixel unit resolution (i.e., in this case, the MVD may indicate a ⅛ pixel unit resolution).

Area 1020 corresponds to an area where each of $threshold_x$ and $threshold_y$ is multiplied by 4. Herein, area 1020 has a ¼ pixel unit resolution. Area 1030 corresponds to an area where each of $threshold_x$ and $threshold_y$ is multiplied by 6. Herein, area 1030 has a ½ pixel unit resolution. Area 1040 corresponds to an area outside of the area 1030, and area 1040 has an integer pixel unit.

Meanwhile, although FIG. 10 is illustrated based on MVPc2, in case of the example wherein the xMVP is selected from xMVPc1 and the yMVP is selected from yMVPc2, the resolution may be applied based on an overlapping area between the areas illustrated based on MVPc2 and the areas illustrated based on MVPc1. For example, in case a position of the MV indicated by the MVD corresponds to an area having ¼ pixel unit resolution based on MVPc2 but also corresponds to an area having ½ pixel unit resolution based on MVPc1, between the two resolutions, the ¼ pixel unit resolution having the relatively higher resolution may be applied, or the ½ pixel unit resolution having the relatively lower resolution may be applied.

FIG. 11 illustrates yet another example of a resolution area according to an exemplary embodiment of the present invention.

FIG. 11 shows an example of a case where the MVPc1 and the MVPc2 have the same value, and, accordingly, the threshold value is equal to 0. In case the threshold value is equal to 0, the size of the area is always equal to 0 regardless of the value by which the threshold value is multiplied. In this exemplary embodiment, the size of the area is increased by adding a random value to the threshold value, and, then, the motion compensation may be performed.

Alternatively, an area may also be defined based on a maximum value and/or a minimum value of the motion resolution area corresponding to the x-axis and/or the y-axis. More specifically, in this case, a maximum value and/or a minimum value of the area may be defined for each resolution.

In this example, area 1110 shows a ⅛ resolution unit, and its minimum area is designated as ±4 along the x-axis and ±2 along the y-axis. Area 1120 shows a ¼ resolution unit, and its minimum area is designated as ±6 along the x-axis and ±4 along the y-axis. And, area 1130 corresponding the remaining area shows a 1/1 resolution unit.

The decoder may derive an MV corresponding to the detailed position indicated by the MVD information based on the above-described resolution units for each area.

Figure 12:
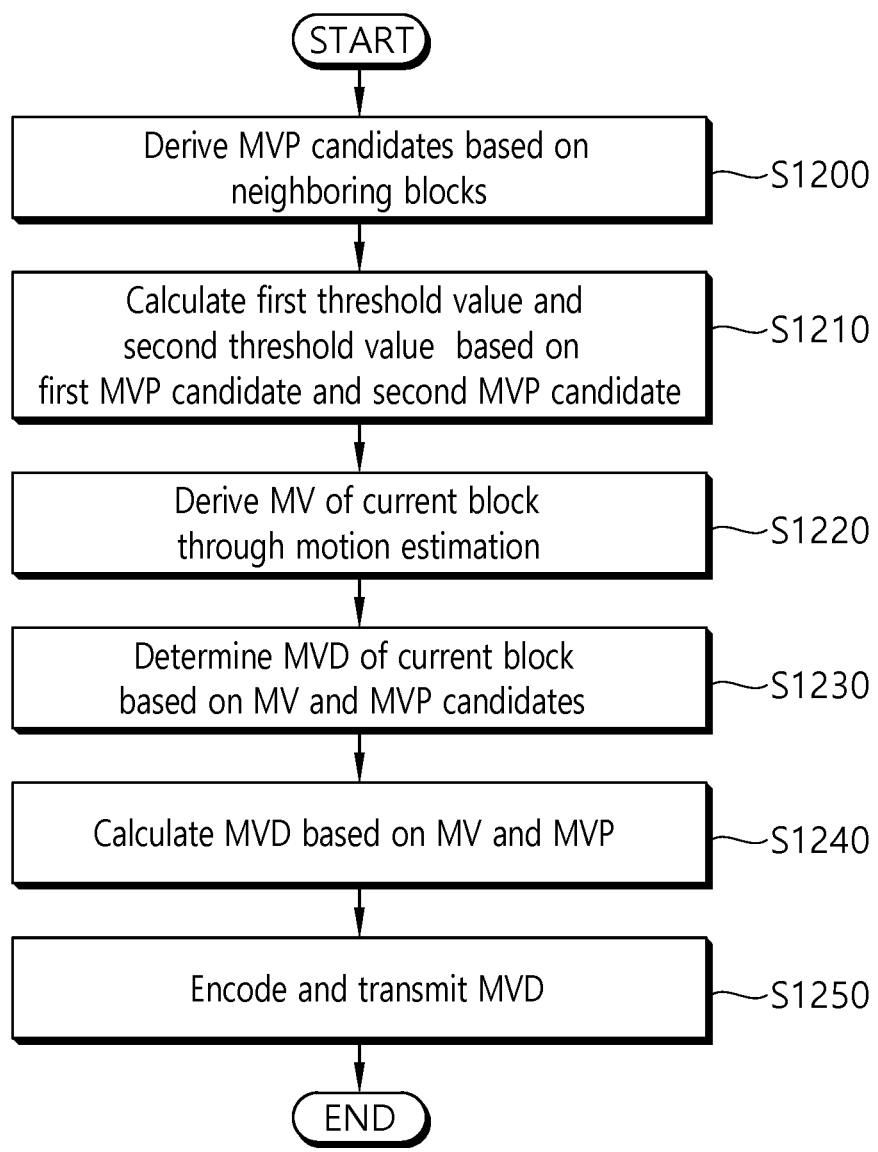
FIG. 12 is a flow chart broadly showing an example of an AMVP method based on a threshold value performed by an encoder.

FIG. 12 is a flow chart broadly showing an example of an AMVP method based on a threshold value performed by an encoder.

Referring to FIG. 12, an encoder derives MVP candidates based on the neighboring blocks of the current block, which correspond to the prediction target (S1200). Herein, the neighboring blocks includes spatially/temporally neighboring blocks. The encoder may use the neighboring blocks, which are, for example, described above in FIG. 3, as candidate blocks, thereby being capable of deriving MVP candidates and configuring the MVPcs.

The encoder calculates a first threshold value and a second threshold value based on the first MVP candidate and the second MVP candidate, which are included in the MVP candidates (S1210). Each of the first MVP candidate and the second MVP candidate respectively includes x-coordinate components xMVPc1 and xMVPc2 and y-coordinate components yMVPc1 and yMVPc2. The encoder may derive the first threshold value based on the xMVPc1 and the xMVPc2 and may also derive the second threshold value based on the yMVPc1 and the yMVPc2.

The encoder derives an MV corresponding to the current block (S1220). By performing a motion estimation process on the current block, the encoder searches for a reference block that is most similar to the current block through a search process according to a predetermined standard within a reference picture. In this case, the encoder may perform a search process in fractional pixel units smaller than the integer pixel unit, i.e., a ½ pixel unit, a ¼ pixel unit, a ⅛ pixel unit, and so on, thereby being capable of finding (or locating or discovering) the reference block. Fractional pixel unit may be generated through an interpolation process.

In this case, the encoder may perform the search by differently configuring the resolution unit in accordance with two or more areas, which are determined based on at least one of the first threshold value and the second threshold value. For example, among the two or more areas, the encoder may perform the search process in the first fractional pixel resolution unit for the first area, and the encoder may perform the search process in the second fractional (or integer pixel) resolution for the second area.

In this case, a value of the first fraction may be smaller than a value of the second fraction. For example, the first fraction may indicate ¼, and the second fraction may indicate ½. Alternatively, the first fraction may indicate ⅛, and the second fraction may indicate ¼ or ½.

The encoder determines an MVP of the current block based on the MV and the MVP candidates (S1230). In this case, the encoder may differentiate the x-axis and the y-axis and may respectively derive an MVP candidate a having an x-coordinate value most approximate to the xMV and an MVP candidate b having a y-coordinate value most approximate to the yMV. Thereafter, the encoder may determine the MVP (xMVP, yMVP) of the current block based on the x-coordinate component of the MVP candidate a and the y-coordinate component of the MVP candidate b.

The encoder calculates the MVD corresponding to the current block based on the MV and the MVP (S1240). The encoder may calculate the MVD by subtracting the MVP from the MV. In this case, the MVD may indicate the first fractional pixel resolution unit for the first area and may indicate the second fractional pixel (or integer pixel) resolution unit for the second area.

The encoder encodes the MVD and transmits the encoded MVD (S1250). The encoder may encode the MVD and may transmit the encoded MVD to the decoder in a bit stream format. In this case, the encoder may divide the MVD into xMVD and yMVD and may respectively perform entropy encoding.

Additionally, the encoder may encode the MVP flag information as required and may transmit the encoded MVP flag information. In this case, the MVP flag information may be divided into xMVP flag information and yMVP flag information. For example, in case the size of the xMVD is larger than the first threshold value, the encoder does not encode nor transmit the xMVP flag information. And, in case the size of the xMVD is not larger than the first threshold value, the encoder may encode and transmit the MVP flag information. Additionally, in case the size of the yMVD is larger than the second threshold value, the encoder does not encode nor transmit the yMVP flag information. And, in case the size of the yMVD is not larger than the second threshold value, the encoder may encode and transmit the MVP flag information.

Figure 13:
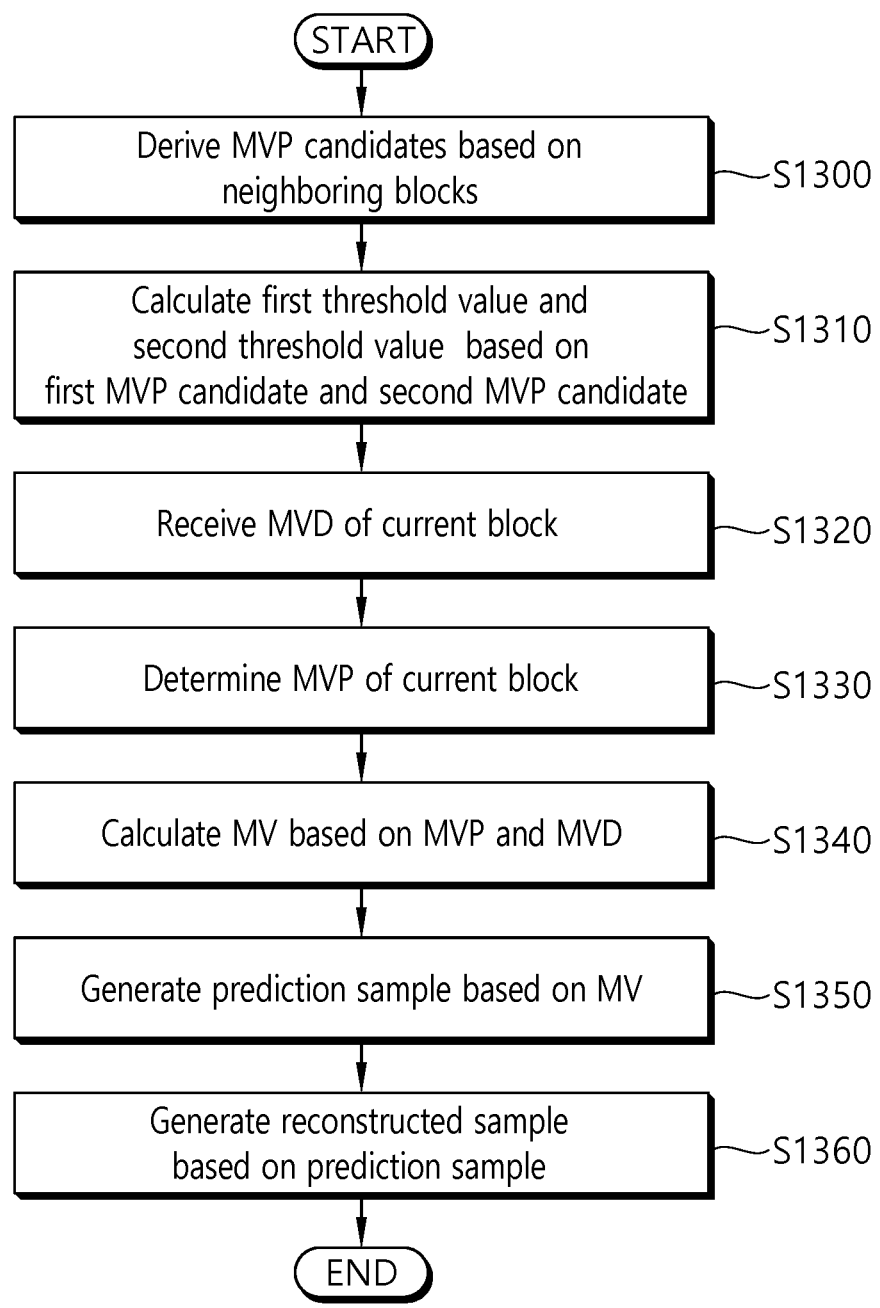
FIG. 13 is a flow chart broadly showing an example of an AMVP method based on a threshold value performed by a decoder.

FIG. 13 is a flow chart broadly showing an example of an AMVP method based on a threshold value performed by a decoder.

Referring to FIG. 13, a decoder derives MVP candidates based on the neighboring blocks of the current block, which correspond to the prediction target (S1300). Herein, the neighboring blocks includes spatially/temporally neighboring blocks. The decoder may use the neighboring blocks, which are, for example, described above in FIG. 3, as candidate blocks, thereby being capable of deriving MVP candidates and configuring the MVPcs.

The decoder calculates a first threshold value and a second threshold value based on the first MVP candidate and the second MVP candidate, which are included in the MVP candidates (S1310). Each of the first MVP candidate and the second MVP candidate respectively includes x-coordinate components xMVPc1 and xMVPc2 and y-coordinate components yMVPc1 and yMVPc2. The decoder may derive the first threshold value based on the xMVPc1 and the xMVPc2 and may also derive the second threshold value based on the yMVPc1 and the yMVPc2. Meanwhile, the MVP candidates may further include a third MVP candidate, and the decoder may calculate a third threshold value and a fourth threshold value based on one of the first MVP candidate and the second MVP candidate and the third MVP candidate. In this case, for example, between the first MVP candidate and the second MVP candidate, the MVP candidate being relatively nearer (or closer to) the third MVP candidate may be selected and used for calculating the third threshold value and the fourth threshold value. Herein, the first and third threshold values may correspond to the threshold values corresponding to the x-axis, and the second and fourth threshold values may correspond to the threshold values corresponding to the y-axis.

The decoder receives the MVD corresponding to the current block (S1320). The decoder may acquire the MVD by receiving a bit stream and performing decoding. The MVD may be divided into xMVD and yMVD.

The decoder derives an MVP corresponding to the current block (S1330). In this case, the decoder may derive the MVP corresponding to the current block based on the first threshold value and the second threshold value.

For example, when a size of the xMVD is larger than the first threshold value, the decoder may derive one of the xMVP candidates of the first MVP candidate and the second MVP candidate as an xMVP, which corresponds to an x-coordinate component of the MVP corresponding to the current block. In this case, if the xMVP corresponds to a positive number, the decoder may derive a component having the relatively larger value between the x-coordinate components of the first MVP candidate and the second MVP candidate as the xMVP corresponding to the current block. And, if the xMVP corresponds to a negative number, the decoder may derive a component having the relatively smaller value between the x-coordinate components of the first MVP candidate and the second MVP candidate as the xMVP corresponding to the current block.

For example, when a size of the yMVD is larger than the second threshold value, the decoder may derive one of the yMVP candidates of the first MVP candidate and the second MVP candidate as a yMVP, which corresponds to a y-coordinate component of the MVP corresponding to the current block. In this case, if the yMVP corresponds to a positive number, the decoder may derive a component having the relatively larger value between the y-coordinate components of the first MVP candidate and the second MVP candidate as the yMVP corresponding to the current block. And, if the yMVP corresponds to a negative number, the decoder may derive a component having the relatively smaller value between the y-coordinate components of the first MVP candidate and the second MVP candidate as the yMVP corresponding to the current block.

Meanwhile, in case the size of the xMVD is not larger than the first threshold value, the decoder may further receive xMVP flag information, and, among the MVP candidates, the decoder may derive the value of the x-coordinate component of the MVP candidate, which is indicated by the xMVP flag information, as the xMVP value. Additionally, in case the size of the yMVD is not larger than the second threshold value, the decoder may further receive yMVP flag information, and, among the MVP candidates, the decoder may derive the value of the y-coordinate component of the MVP candidate, which is indicated by the yMVP flag information, as the yMVP value.

Herein, the value of the first MVP candidate and the value of the second MVP candidate may be different from one another. And, the first MVP candidate and the second MVP candidate may correspond to two MVP candidates having the shortest distance between one another among the derived MVP candidates.

Additionally, for example, the decoder may derive the MVP corresponding to the current block based on the MVD and the first threshold value, the second threshold value, the third threshold value, and the fourth threshold value. In this case, as described above in FIG. 4 and FIG. 5, the first threshold value and the second threshold value may be respectively applied for the first and second MVP candidates, and the third threshold value and the fourth threshold value may be respectively applied to one of the first and second MVP candidates and the third MVP candidate. Thus, an optimal MVP may be deduced.

The decoder calculates an MV of the current block based on the MVP and the MVD (S1340). Herein, the MVD may adaptively indicate another resolution unit in accordance with two or more areas being determined based on at least one of the first threshold value and the second threshold value.

For example, the xMVD may indicate a first fractional pixel resolution unit for a first area, among the two or more areas, and the xMVD may indicate a second fractional pixel or integer pixel resolution unit for a second area.

Also, the yMVD may indicate a first fractional pixel resolution unit for a first area, among the two or more areas, and the yMVD may indicate a second fractional pixel or integer pixel resolution unit for a second area.

The two or more areas may be determined based on at least one of the corrected threshold values, which are generated by adding a specific value to at least one of the first threshold value and the second threshold value, by subtracting a specific value from at least one of the first threshold value and the second threshold value, or by multiplying at least one of the first threshold value and the second threshold value by a specific value.

Additionally, the two or more areas may be determined based on at least one of a minimum value and a maximum value being predetermined for at least one of the first threshold value and the second threshold value.

In this case, a value of the first fraction may be smaller than a value of the second fraction. For example, the first fraction may indicate ¼, and the second fraction may indicate ½. Alternatively, the first fraction may indicate ⅛, and the second fraction may indicate ¼ or ½.

The decoder generates a prediction sample within the current block based on the MV (S1350). The decoder may derive a reference block within a reference picture based on the MV. In this case, the decoder may refer to a change in the resolution according to the area and may specify a position, which is indicated by the MV within the reference picture. The decoder generates a prediction sample (or prediction sample array) of the current block based on the reference block, which is located at the specified position.

The decoder generates a recovery sample based on the prediction sample (S1360). The decoder may add a residual sample (or residual sample array, residual signal) to the prediction sample (or prediction sample array) so as to generate the recovery sample (or recovery sample array).

Figure 14:
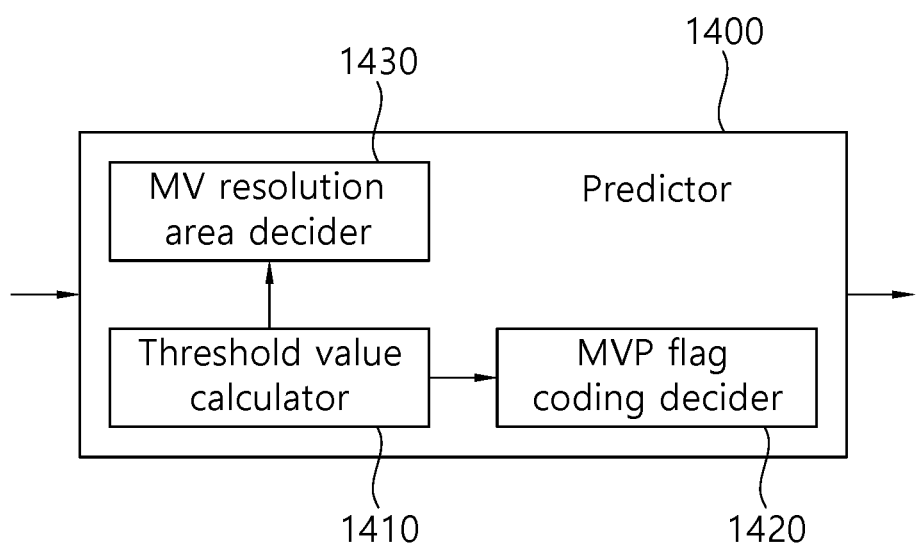
FIG. 14 is a conceptual diagram broadly showing a predictor according to an exemplary embodiment of the present invention.

FIG. 14 is a conceptual diagram broadly showing a predictor according to an exemplary embodiment of the present invention. The predictor may be included in a video encoder or may be included in a video decoder.

Referring to FIG. 14, the predictor 1400 may include a threshold value calculator 1410, an MVP flag coding decider 1420, and an MV resolution area decider 1430. In an encoder, the predictor 1400 may further include a motion estimator, which performs a motion estimation corresponding to the current block. And, in a decoder, the predictor 1400 may further include a motion compensator, which generates a prediction sample based on motion information corresponding to the current block.

The threshold value calculator 1410 derives MVP candidates based on blocks surrounding (or neighboring) the current block (i.e., surrounding (or neighboring) blocks), the current block being a prediction target, and, then, the threshold value calculator 1410 calculates a first threshold value and a threshold value based on a first MVP candidate and a second MVP candidate, which are included in the MVP candidates. The first MVP candidate and the second MVP candidate respectively includes x-coordinate components xMVPc1 and xMVPc2 and y-coordinate components yMVPc1 and yMVPc2. And, the threshold value calculator 1410 may derive a first threshold value based on xMVPc1 and xMVPc2 and may derive a second threshold value based on yMVPc1 and yMVPc2.

The threshold calculator 1410 may calculate a value, which is obtained by dividing an absolute value of a difference between the xMVPc1 and the xMVPc2 by 2, as the first threshold value. Also, the threshold calculator 1410 may calculate a value, which is obtained by dividing an absolute value of a difference between the yMVPc1 and the yMVPc2 by 2, as the second threshold value.

The MVP flag coding decider 1420 determines whether or not to perform coding of the MVP flag information (hereinafter referring to encoding in case of the encoder and decoding in case of the decoder) based on the MVD corresponding to the current block and also based on the first threshold value and the second threshold value.

For example, when a size of the xMVD is larger than the first threshold value, the MVP flag coding decider 1420 may derive one of the xMVP candidates of the first MVP candidate and the second MVP candidate as an xMVP, which corresponds to an x-coordinate component of the MVP corresponding to the current block. In this case, if the xMVP corresponds to a positive number, the MVP flag coding decider 1420 may derive a component having the relatively larger value between the x-coordinate components of the first MVP candidate and the second MVP candidate as the xMVP corresponding to the current block. And, if the xMVP corresponds to a negative number, the MVP flag coding decider 1420 may derive a component having the relatively smaller value between the x-coordinate components of the first MVP candidate and the second MVP candidate as the xMVP corresponding to the current block. More specifically, in this case, the encoder may encode the xMVP flag information, and the decoder may derive the xMVP without performing xMVP flag information decoding.

For example, when a size of the yMVD is larger than the second threshold value, the MVP flag coding decider 1420 may derive one of the yMVP candidates of the first MVP candidate and the second MVP candidate as a yMVP, which corresponds to a y-coordinate component of the MVP corresponding to the current block. In this case, if the yMVP corresponds to a positive number, the MVP flag coding decider 1420 may derive a component having the relatively larger value between the y-coordinate components of the first MVP candidate and the second MVP candidate as the yMVP corresponding to the current block. And, if the yMVP corresponds to a negative number, the MVP flag coding decider 1420 may derive a component having the relatively smaller value between the y-coordinate components of the first MVP candidate and the second MVP candidate as the yMVP corresponding to the current block. More specifically, in this case, the encoder may encode the yMVP flag information, and the decoder may derive the yMVP without performing yMVP flag information decoding.

Meanwhile, in case the size of the xMVD is not larger than the first threshold value, the MVP flag coding decider 1420 determines to perform coding of the xMVP flag information. And, in case the size of the yMVD is not larger than the second threshold value, the MVP flag coding decider 1420 determines to perform coding of the yMVP flag information.

The MV resolution area decider 1430 adaptively determines a resolution unit in accordance with two or more areas being determined based on at least one of the first threshold value and the second threshold value.

The MV resolution area decider 1430 may configure the xMVD to indicate a first fractional pixel resolution unit for a first area, among the two or more areas, and the MV resolution area decider 1430 may configure the xMVD to indicate a second fractional pixel or integer pixel resolution unit for a second area.

Also, the MV resolution area decider 1430 may configure the yMVD to indicate a first fractional pixel resolution unit for a first area, among the two or more areas, and the MV resolution area decider 1430 may configure the yMVD to indicate a second fractional pixel or integer pixel resolution unit for a second area.

The MV resolution area decider 1430 may determine the two or more areas based on at least one of the corrected threshold values, which are generated by adding a specific value to at least one of the first threshold value and the second threshold value, by subtracting a specific value from at least one of the first threshold value and the second threshold value, or by multiplying at least one of the first threshold value and the second threshold value by a specific value.

The MV resolution area decider 1430 may also determine the two or more areas based on at least one of a minimum value and a maximum value being predetermined for at least one of the first threshold value and the second threshold value. In this case, a value of the first fraction may be smaller than a value of the second fraction. For example, the first fraction may indicate ¼, and the second fraction may indicate ½. Alternatively, the first fraction may indicate ⅛, and the second fraction may indicate ¼ or ½.

In this case, when performing the motion estimation, the encoder may quickly perform a search by varying the resolution in accordance with the corresponding area. And, when performing the motion compensation, the decoder may derive the MV from a larger area by using a smaller MVD value. In this case, the bit size (or number of bits) used for the MVD transmission/reception is decreased, and, accordingly, the coding efficiency may be enhanced.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means.

What is claimed is:

1. A decoding method for an image performed by a decoding apparatus, comprising:
receiving a motion vector difference (MVD) corresponding to a current block;
deriving motion vector predictor (MVP) candidates based on neighboring blocks of the current block;
calculating a first threshold value and a second threshold value based on a first MVP candidate and a second MVP candidate being included in the MVP candidates;
deriving an MVP corresponding to the current block based on the MVD and the first threshold value and the second threshold value;
calculating a motion vector (MV) of the current block based on the MVP and the MVD;
generating a prediction sample within the current block based on the MV; and
generating a recovery sample based on the prediction sample.

2. The method of claim 1, wherein the first MVP candidate and the second MVP candidate respectively includes x-coordinate components xMVPc1 and xMVPc2 and y-coordinate components yMVPc1 and yMVPc2,
wherein the first threshold value is derived based on the xMVPc1 and the xMVPc2, and
wherein the second threshold value is derived based on the yMVPc1 and the yMVPc2.

3. The method of claim 2, wherein the first threshold value is obtained by dividing an absolute value of a difference between the xMVPc1 and the xMVPc2 by 2, and
wherein the second threshold value is obtained by dividing an absolute value of a difference between the yMVPc1 and the yMVPc2 by 2.

4. The method of claim 2, wherein the MVD includes an x-coordinate component xMVD and a y-coordinate component yMVD, and
wherein, in case a size of the xMVD is larger than the first threshold value, one of the x-coordinate components of the first MVP candidate and the second MVP candidate is derived as the xMVP corresponding to the current block, the xMVP being an x-coordinate component of the MVP.

5. The method of claim 4, wherein, in case the xMVD is a positive number, a component having a relatively larger value between the x-coordinate components of the first MVP candidate and the second MVP candidate is derived as the xMVP corresponding to the current block, and, in case the xMVD is a negative number, a component having a relatively smaller value between the x-coordinate components of the first MVP candidate and the second MVP candidate is derived as the xMVP corresponding to the current block.

6. The method of claim 4, wherein, in case a size of the yMVD is larger than the second threshold value, one of the y-coordinate components of the first MVP candidate and the second MVP candidate is derived as the yMVP corresponding to the current block, the yMVP being a y-coordinate component of the MVP.

7. The method of claim 6, wherein, in case the yMVD is a positive number, a component having a relatively larger value between the y-coordinate components of the first MVP candidate and the second MVP candidate is derived as the yMVP corresponding to the current block, and, in case the yMVD is a negative number, a component having a relatively smaller value between the y-coordinate components of the first MVP candidate and the second MVP candidate is derived as the yMVP corresponding to the current block.

8. The method of claim 4, further comprising:
in case the size of the xMVD is not larger than the first threshold value, receiving xMVP flag information,
wherein a value of the xMVP is equal to a value of an x-coordinate component of an MVP candidate indicated by the xMVP flag information among the MVP candidates.

9. The method of claim 2, further comprising:
in case the size of the yMVD is not larger than the second threshold value, receiving yMVP flag information,
wherein a value of the yMVP is equal to a value of a y-coordinate component of an MVP candidate indicated by the yMVP flag information among the MVP candidates.

10. The method of claim 2, wherein a value of the first MVP candidate and a value of the second MVP candidate are different from one another, and wherein the first MVP candidate and the second MVP candidate correspond to two MVP candidates having a shortest distance between one another among the derived MVP candidates.

11. The method of claim 2, wherein the MVP candidates further include a third MVP candidate,
wherein a third threshold value and a fourth threshold value are calculated based on the third MVP candidate or one of the first MVP candidate and the second MVP candidate being relatively closer to the third MVP candidate, and
wherein an MVP corresponding to the current block is derived based on the MVD and the first threshold value, the second threshold value, the third threshold value, and the fourth threshold value.

12. The method of claim 2, wherein the xMVD indicates a first fractional pixel resolution unit for a section not larger than the first threshold value and the xMVD indicates a second fractional pixel or integer pixel resolution unit for a section larger than the first threshold value,
wherein the yMVD indicates a first fractional pixel resolution unit for a section not larger than the second threshold value and the yMVD indicates a second fractional pixel or integer pixel resolution unit for a section larger than the second threshold value, and
wherein a value of the first fraction is smaller than a value of the second fraction.

13. The method of claim 12, wherein the first fraction indicates ¼ and the second fraction indicates ½.

14. An inter prediction method for an image performed by a decoding apparatus, comprising:
receiving a motion vector difference (MVD) corresponding to a current block;
deriving motion vector predictor (MVP) candidates based on neighboring blocks of the current block;
calculating a first threshold value and a second threshold value based on a first MVP candidate and a second MVP candidate being included in the MVP candidates;

deriving an MVP corresponding to the current block based on the derived MVP candidates;

calculating a motion vector (MV) of the current block based on the MVP and the MVD; and generating a prediction sample within the current block based on the MV, wherein the MVD adaptively indicates another resolution unit in accordance with two or more areas being determined based on at least one of the first threshold value and the second threshold value, wherein the first MVP candidate and the second MVP candidate include x-coordinate components xMVPc1 and xMVPc2, and y-coordinate components yMVPc1 and yMVPc2, respectively, wherein the first threshold value is derived by dividing an absolute value of a difference between the xMVPc1 and the xMVPc2 by 2, and wherein the second threshold value is derived by dividing an absolute value of a difference between the yMVPc1 and the yMVPc2 by 2.

15. The method of claim 14, wherein the MVD includes an x-coordinate component xMVD and a y-coordinate component yMVD, and wherein, among the two or more areas, the xMVD indicates a first fractional pixel resolution unit for a first area and indicates a second fractional pixel or integer pixel resolution unit for a second area.

16. The method of claim 14, wherein the MVD includes an x-coordinate component xMVD and a y-coordinate component yMVD, and wherein, among the two or more areas, the yMVD indicates a first fractional pixel resolution unit for a first area and indicates a second fractional pixel or integer pixel resolution unit for a second area.

17. The method of claim 14, wherein the two or more areas are determined based on at least one corrected threshold value being generated by adding a specific value to at least one of the first threshold value and the second threshold value, by subtracting a specific value from at least one of the first threshold value and the second threshold value, or by multiplying at least one of the first threshold value and the second threshold value by a specific value.

18. The method of claim 14, wherein the two or more areas are determined based on at least one of a minimum value and a maximum value being predetermined in advance for at least one of the first threshold value and the second threshold value.

* * * * *